US008111693B2

(12) United States Patent
Shurboff et al.

(10) Patent No.: US 8,111,693 B2
(45) Date of Patent: Feb. 7, 2012

(54) BROADCAST MESSAGING IN WIRELESS COMMUNICATION NETWORKS

(75) Inventors: Carl L Shurboff, Grayslake, IL (US); William P. Alberth, Jr., Crystal Lake, IL (US); Dean E Thorson, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 565 days.

(21) Appl. No.: 12/211,383

(22) Filed: Sep. 16, 2008

(65) Prior Publication Data

US 2009/0168684 A1 Jul. 2, 2009

Related U.S. Application Data

(60) Provisional application No. 61/018,161, filed on Dec. 31, 2007.

(51) Int. Cl.
*H04L 12/28* (2006.01)

(52) U.S. Cl. ........ 370/390; 370/252; 370/338; 370/432; 455/404.1

(58) Field of Classification Search ........................ None
See application file for complete search history.

(56) References Cited

U.S. PATENT DOCUMENTS 6,543,051 B1 4/2003 Manson et al.
7,054,612 B2 5/2006 Patel
7,672,667 B2 * 3/2010 Ramesh et al. ............ 455/422.1
2005/0255862 A1 * 11/2005 Jung et al. .................. 455/456.2
2006/0040639 A1 2/2006 Karl et al.
2007/0201391 A1 8/2007 Belmonte et al.
2008/0039008 A1 * 2/2008 Chen et al. ................... 455/3.01
2009/0252253 A1 * 10/2009 Choi et al. .................... 375/270
2010/0081464 A1 * 4/2010 Qu et al. ....................... 455/466

FOREIGN PATENT DOCUMENTS

WO 2005072075 A2 8/2005

OTHER PUBLICATIONS

FCC Commercial Mobile Service Alert Advisory Committee; "Draft—PMG-0035 Commercial Mobile Alert Service Architecture and Requirements"; Version 0.2.1; Revision Date Jul. 23, 2007; 78 Pages.
PCT/US2008/088365, PCT Search Report and Written Opinion Dated Aug. 10, 2009.

* cited by examiner

*Primary Examiner* — Duc C Ho
(74) *Attorney, Agent, or Firm* — Roland K. Bowler, II

(57) ABSTRACT

A method for receiving a broadcast message in a wireless communication device is disclosed. The device receives a broadcast message that has associated therewith a unique message grouping identifier and determines whether the unique message grouping identifier of the received message is equal to a unique message grouping identifier of a previously received message. The device ignores the received broadcast message when the unique message grouping identifier of the received message is equal to the unique message grouping identifier of the previously received message and in some implementations enters sleep mode.

8 Claims, 3 Drawing Sheets

EACM Slot 1.1 is English; slot 1.2 is Spanish; slot 1.3 is Chinese…

BROADCAST MESSAGING IN WIRELESS COMMUNICATION NETWORKS

CROSS-REFERENCE TO RELATED APPLICATIONS

The present application claims benefits under 35 U.S.C. 119(e) to U.S. Provisional Application No. 61/018,161 filed on 31 Dec. 2007, the contents of which are incorporated herein by reference.

FIELD OF THE DISCLOSURE

The present disclosure relates generally to wireless communications and more particularly to adaptive broadcast/multicast systems in wireless communication networks, corresponding entities and methods.

BACKGROUND

The primary mission of the Communications Technology Group (CTG) is to develop and submit recommendations for relevant technical standards for devices and equipment and technologies used by electing commercial mobile service (CMS) providers to transmit emergency alerts to subscribers (see WARN Act §603(c)(3)).

In an effort to provide emergency alerts over wireless communication systems to the public, commercial mobile service (CMS) providers may elect to provide emergency broadcast services as provided for under the WARN act. In this system, devices capable of receiving broadcasts monitor cell broadcast services from a respective CMS for the emergency alert messages. The devices constantly monitor for messages whether or not message are being delivered. The constant monitoring as well as duplicate message receipts by a device results in unnecessary current drain causing the battery life of the device to be diminished. While some solutions have addressed the issue of high current drain levels during times when emergency alert messages are not being received, these solutions do not address high current drain during a period of use of the emergency system when alert messages are being received. Additionally, the language of the message cannot be tailored to the recipient.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
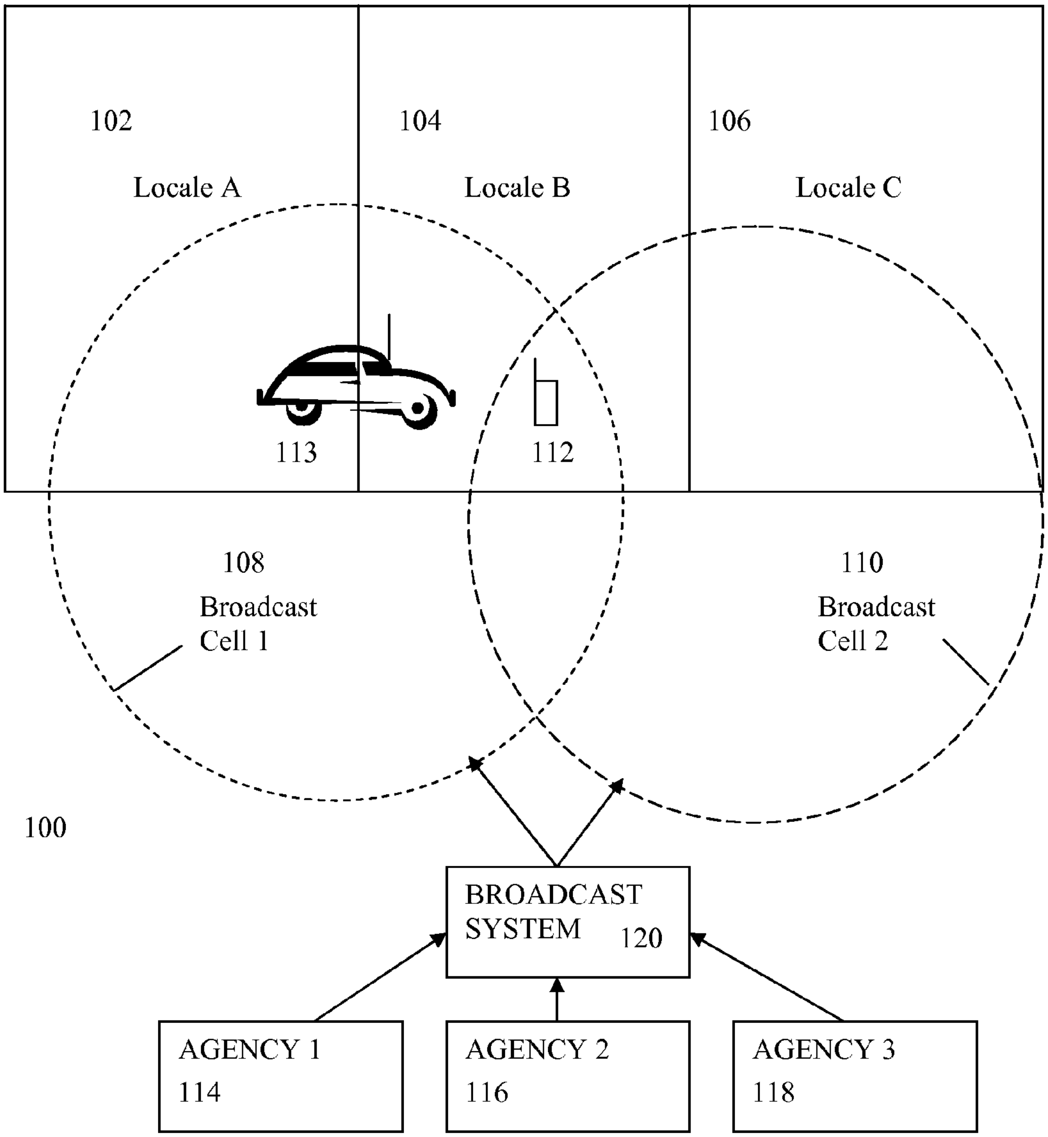
FIG. 1 illustrates a wireless communication network and a plurality of locales.

While the present invention is achievable by various forms of embodiment, there is shown in the drawings and described hereinafter several examples of embodiments with the understanding that the present disclosure is to be considered an exemplification of the invention and is not intended to limit the invention to the specific embodiments contained herein as will become more fully apparent from the discussion below. It is further understood that the method for targeted broadcast messaging of the present invention may be used more generally in any application where it is desirable to provide messages to specific geographical regions containing specific content for that region, device, recipient or combination thereof.

The following detailed description is merely exemplary in nature and is not intended to limit the inventive subject matter or the application and uses of the inventive subject matter. Furthermore, there is no intention to be bound by any notion or theory presented in the preceding background or the following detailed description.

It is to be understood that a remote station (mobile device) is a remote station coupled, wirelessly in this exemplary embodiment, to a network that broadcasts messages. The remote device may also be referred to as a mobile, mobile station, remote station, user equipment, user terminal, handheld or the like. In one embodiment described the remote device is wirelessly connected to the network through one or more base stations. In this exemplary embodiment the remote device receives messages broadcast to a predefined region by the network. In another exemplary embodiment the remote device receives the message in a specific format. It is understood that these are exemplary embodiments and that other criteria may be used for scheduling message broadcast and reception.

In one exemplary embodiment, the remote device is an electronic device such as a radiotelephone. The radiotelephone described herein is a representation of the type of wireless communication device that may benefit from the present invention. However, it is to be understood that the present invention may be applied to any type of remote station for receiving broadcast messaging, but not limited to, the following devices: radiotelephones, cordless phones, paging devices, personal digital assistants, computers, WiFi systems, WiMAX systems, handheld devices, remote control units, portable media players (such as an MP3 or DVD player) that have wireless communication capability and the like. Accordingly, any reference herein to the remote device should also be considered to apply equally to other remote electronic devices.

Before describing in detail exemplary embodiments that are in accordance with the present invention, it should be observed that the embodiments reside primarily in combinations of method steps and apparatus components related to broadcast messaging. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention.

It is further understood that the use of relational terms, if any, such as first and second, such as a first timer and a second timer, and the like are used solely to distinguish one from another entity or action without necessarily requiring or implying any actual such relationship or order between such entities or actions.

The network has broadcast capability, allowing a plurality of remote devices to receive broadcast messages. In one embodiment, the network is a cellular network having cell broadcast capabilities. In this embodiment a broadcast system 120 includes a mobile switching center (MSC) which is communicably coupled to location registers, for example home and visitor location registers, or similar entities known generally by those having ordinary skill in the art. The MSC may be communicably coupled to a public switched telephone network (PSTN) and to a mobility and data session management entity coupled to a network gateway, for example, a serving GPRS support node (SGSN), coupled to a gateway GPRS support node (GGSN). Remote devices in FIG. 1, communicate within the wireless communication network and/or with other networks, for example, broadcast system 120, via the access and core networks.

Exemplary communication networks include 2.5 Generation 3GPP GSM networks, 3rd Generation 3GPP WCDMA networks, 3GPP2 CDMA communication networks, 802.11, 802.16 and the like, among other existing and future generation cellular communication networks such as the Universal Mobile Telecommunications System (UMTS) networks, Evolved Universal Terrestrial Radio Access (E-UTRA) networks, WiMAX and other fourth generation networks. The network may also be of a type that implements frequency-domain oriented multi-carrier transmission techniques, such as Orthogonal Frequency Division Multiple Access (OFDM), DFT-Spread-OFDM (DFT-SOFDM), and single-carrier based approaches with orthogonal frequency division (SC-FDMA), particularly Interleaved Frequency Division Multiple Access (IFDMA) and its frequency-domain related variant known as DFT-Spread-OFDM (DFT-SOFDM). The disclosure is not limited however to these exemplary networks, but is applicable more generally to any network having broadcast capability.

FIG. 1 illustrates a broadcast communication system 100 having a broadcast footprint covering a geographical region for broadcasting messages to remote devices. The geographical region comprises sub-regions. In this embodiment, there are three sub-regions or locales, locale A 102, locale B 104 and locale C 106. The three locales are used as an example only and it is understood that the number of sub-regions or locales may be different. The locales, which may be defined by a plurality of criteria, are target reception areas for the broadcast messages. The broadcast messages may be originated by a plurality of message generating entities. The broadcast message may also be sent using a plurality of messaging formats such as SMS, MMS or the like.

In this embodiment, there is a first broadcast cell 108 and a second broadcast cell 110, both of which cover at least one locale and may cover a plurality of the locales or portions thereof. The broadcast cells 108, 110 transmit messages, to a first remote unit 112 and a second remote unit 113; only two remote units are shown for simplicity. In this embodiment, the second remote device 113 is in a moving vehicle and is shown traveling from locale A to locale B. In an alternative embodiment, there may only be one broadcast cell for the entire region having multiple locales or there may be a plurality of broadcast cells in each locale. In the cases where there is one broadcast cell, one base station for the cell may broadcast to a plurality of sectors within the cell. Messages may then be targeted to specific sectors within the cell.

For exemplary purposes, three entities that generate messages are shown; a first messaging entity 114, a second messaging entity 116, and a third messaging entity 118. In one embodiment the first messaging entity 114 may be a federal agency, the second entity may be a state agency and the third entity may be a county or city agency, for example, all of which generate emergency alert messages to be transmitted to the remote devices 112, 113. The messaging entities are not necessarily generating emergency related content; other types of messages may be transmitted and emergency alerts are used as one example. Although two remote devices are shown here for simplicity, it is generally understood that a plurality of remote receiving devices are a part of the broadcast system.

The plurality of message generating entities generates and then send the messages to the broadcast system or systems to be distributed to the remote devices. The messages received at broadcast network systems from the different entities may be aggregated and then delivered to the broadcast systems, for example, broadcast system 120, particularly when the messages contain the same content such as in an emergency alert for example. The message are grouped by the locale that each message is targeted for and then subsequently delivered to the remote devices 113, 112 in the intended locale. One example of a message that may be targeted for one locale versus another is a flood warning message. In this example, the flood warning message may be transmitted to one county where a flooding river resides. However an adjacent county may not have flood conditions requiring a warning message. Multiple messages may be sent out over time to the same locale or to different locales as the flooding progresses. Messages for the same flooding instance may be sent to different locales. However the content may differ as the message has specific information pertinent to the targeted locale such as the names of flooded streets, towns, flood levels and the like.

Figure 2:
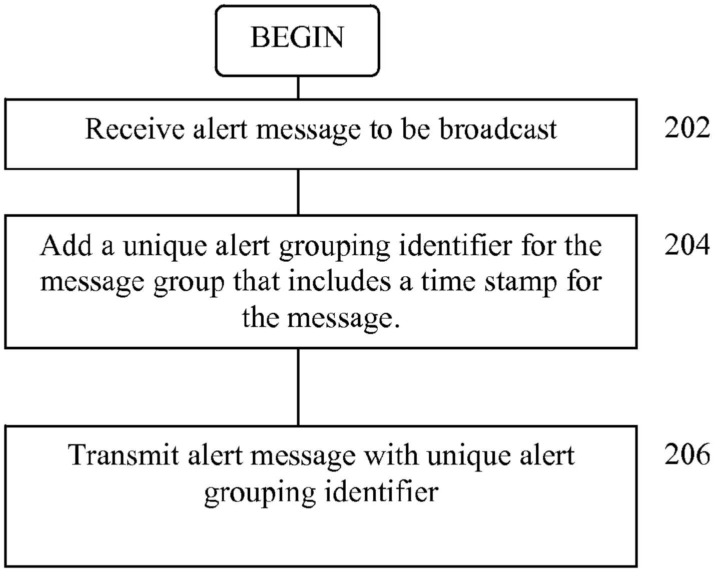
FIG. 2 illustrates a broadcast message process.

FIG. 2 illustrates one embodiment of a message having a unique message grouping (UMG) identifier. So that a receiving device may differentiate between a plurality of received messages, a UMG identity is associated with the message. In one embodiment, the UMG identifier is inserted into the header of the message for quick identification by the device. If another entity wants to send the same message or the same message is retransmitted, the UMG does not change. In step 202, the broadcast system receives the alert message from a messaging entity. A unique message group and a time stamp is assigned to the alert message in step 204. The message is broadcast to the identified locations in step 206. The same message with the same UMG may be transmitted multiple times to insure that a high percentage of the population receives the message.

Figure 3:
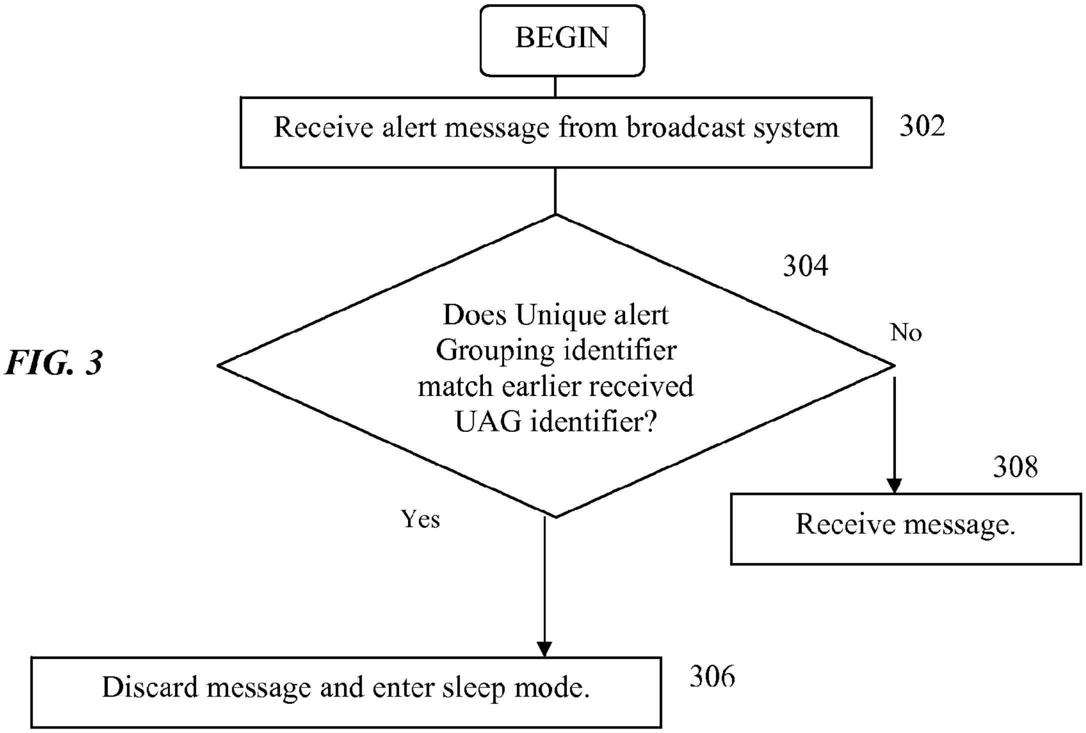
FIG. 3 illustrates another broadcast message process.

FIG. 3 illustrates a process for the remote device receiving a message having a UMG. A message alert is received from the broadcast system in step 302. At step 304, the UMG of the message is determined and if the message UMG has not been received previously, the message is received (308). However, if the message has not been received previously then the message is discarded at step 306. In one embodiment, the remote device discontinues reception of the message that has been received previously. The device may also enter a sleep mode upon determining that the message has been received previously.

As the device begins to receive the message, the remote device checks the UMG and determines whether or not the message has already been received or whether or not the message is a new message. If the UMG is unique, indicating that the message is new and has not been received, the device may in response take a first action and receive the message. If the device determines that the UMG is not unique and has been received in a previous message, the device may determine that the message is not new and take a second action such as discontinue reception of the message.

In one embodiment, the message is a weather alert message generated by a weather source such as the National Oceanic and Atmospheric Administration (NOAA). In this embodiment, NOAA is the message generating entity. The weather alert message is intended for a particular county at a particular time as there is, for example, a storm moving into that county (i.e., a first locale). As the storm moves into a second locale, the second locale is added to the target recipient grouping. However, the first locale has already received the message. In this embodiment, when the second weather alert message is broadcast, with the first and second locales as intended targets, the first receiving device 113 determines from the UMG in the message that it has already received that weather alert message and ignores the remainder of the message. The second receiving device in the second locale 112 continues to receive the message. In this embodiment, once the first device 113 determines that the message has already been received, the first device 113 enters sleep mode to conserve energy instead of utilizing energy to receive and display the message. This may be particularly useful in emergency situations when power may be out.

In one embodiment the UMG is created based on a point in time that the message is being sent or generated. The UMG is then changed by the broadcast system each time a new message is added to the system at a different time.

In one embodiment the system is a 3GPP system and the UMG is sent in the Quick Paging Channel of a 3GPP system. In another embodiment the UMG is placed in a standard paging channel. In still another embodiment the UMG is sent over a broadcast channel.

In one embodiment, the remote device may enter a current drain reduced mode in order to conserve power based on the message received. In some devices this may be a sleep mode. In one embodiment, if the UMG of the message is not different than a previously received message, the device enters a current drain reduced mode to conserve energy, instead of continuing to receive the message or constantly monitoring and receiving messages already received.

Figures 4, 5:
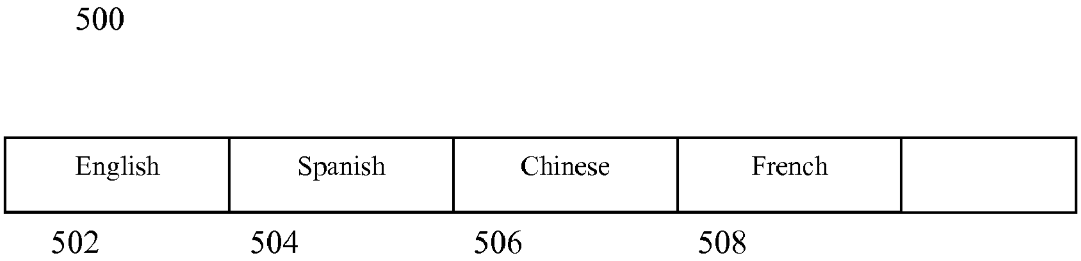
FIG. 4 illustrates one Emergency Alert Configuration Message.
FIG. 5 illustrates a multiple content message.

FIG. 4 illustrates an Emergency Alert Configuration Message (EACM). In this embodiment an Emergency Alert Configuration Message (EACM) is generated and sent to the remote devices prior to alert message transmissions. The EACM informs the remote device 112 how the portions of the alert message are divided up. The configuration message may comprise, for example: Header, Message #1 English, Message #1.2 Spanish, Message #1.3 Chinese. The header would also include the length of each message to permit the receiving device to power up the receive circuitry to only receive the desired portions. In this embodiment only a single portion of a plurality of portions of the message are intended to be received by the remote device 112. For example, a device may be configured to receive messages in Spanish only. An alert message may be transmitted by the broadcast system in a plurality of languages including Spanish. The EACM informs the device of the configuration and the device determines which portion of the message to receive, in this embodiment the second portion of the message which is the Spanish portion. The device 112 determines that the target message is being received and in one embodiment only listens or receives the portion of the message for the portion it has decided to receive or receives all portions and discards the information the device has intended not to use.

FIG. 5 illustrates a message content identification method. A Unique Message Identifier (UMI) is an identification carried in each potion of the message and indicates the characteristic of the specific portion of the message. For example, wherein a single alert message is broadcast in a plurality of languages, as discussed above, each portion of the message would include a UMI. In one embodiment, the device would receive the alert message and monitor the message for the UMI in each portion of the message only. The device would then receive the portion of the message it is configured to receive.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for receiving a broadcast message in a wireless communication device, the method comprising:

receiving, at the wireless communication device, a portion of a broadcast message that has associated therewith a unique message grouping identifier, the portion of the broadcast message received includes the unique message grouping identifier;

determining whether the unique message grouping identifier is the same as a unique message grouping identifier of a previously received message; and discontinuing reception of the partially received broadcast message in response to determining that the unique message grouping identifier of the received message is the same as the unique message grouping identifier of the previously received message.

2. The method of claim 1, further comprising entering sleep mode in response to determining that the unique message grouping identifier of the received message is the same as the unique message grouping identifier of the previously received message.

3. The method of claim 1, further comprising receiving the unique message grouping identifier as part of the head of a message.

4. A method for receiving a broadcast message in a wireless communication device, the method comprising:

receiving, at the wireless communication device, a portion of a broadcast message that has associated therewith a unique message grouping identifier, the portion of the broadcast message received includes the unique message grouping identifier;

determining whether the unique message grouping identifier is not the same as a unique message grouping identifier of a previously received message; and continuing to receive a remaining portion of the broadcast message in response to determining that the unique message grouping identifier of the received message is not the same as the unique message grouping identifier of the previously received message.

5. A wireless communication device comprising:

a receiver configured by the wireless communication device to receive a portion of a broadcast message that has associated therewith a unique message grouping identifier, the portion of the broadcast message received includes the unique message grouping identifier;

the wireless communication device configured to determine whether the unique message grouping identifier is the same as a unique message grouping identifier of a message previously received by the wireless communication device; and the wireless communication device configured to discontinue reception of the partially received broadcast message in response to determining that the unique message grouping identifier of the received message is the same as the unique message grouping identifier of the previously received message.

6. The device of claim 5, the wireless communication device configured to enter sleep mode in response to determining that the unique message grouping identifier of the received message is the same as the unique message grouping identifier of the previously received message.

7. The device of claim 5, wherein the unique message grouping identifier is part of the head of a message.

8. A wireless communication device comprising:

a receiver configured to receive a portion of a broadcast message that has associated therewith a unique message grouping identifier, the portion of the broadcast message received includes the unique message grouping identifier;

the wireless communication device configured to determine whether the unique message grouping identifier is not the same as a unique message grouping identifier of a message previously received at the wireless communication device; and the wireless communication device configured to continue to receive a remaining portion of the broadcast message in response to determining that the unique message grouping identifier of the received message is not the same as the unique message grouping identifier of the previously received message.

* * * * *